United States Patent
Genell

(10) Patent No.: US 6,324,411 B1
(45) Date of Patent: Nov. 27, 2001

(54) BACKGROUND SOFTWARE LOADING IN CELLULAR TELECOMMUNICATION SYSTEMS

(75) Inventor: Bror Erik Gunnar Genell, Stockholm (SE)

(73) Assignee: Telefonaktiebolaget LM Ericsson (publ), Stockholm (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/859,395

(22) Filed: May 20, 1997

(51) Int. Cl.[7] ................. H04B 1/38; H04M 3/00

(52) U.S. Cl. ........................... 455/561; 455/419

(58) Field of Search ................... 455/517, 403, 455/550, 561, 558, 560, 418, 419, 420, 8; 395/200.5, 200.69, 200.51, 200.47, 200.43; 370/410, 522; 707/204

(56) References Cited

U.S. PATENT DOCUMENTS

| | | | |
|---|---|---|---|
| 4,229,789 | * 10/1980 | Morgan et al. | 395/500 |
| 4,730,187 | 3/1988 | Menich et al. | 340/825.5 |
| 4,954,941 | * 9/1990 | Redman | 395/712 |
| 5,339,430 | * 8/1994 | Lundin et al. | 705/305 |
| 5,359,730 | * 10/1994 | Marron | 395/712 |
| 5,410,703 | * 4/1995 | Nilsson et al. | 395/712 |
| 5,418,837 | * 5/1995 | Johansson et al. | 455/558 |
| 5,421,017 | * 5/1995 | Scholz et al. | 395/712 |

(List continued on next page.)

FOREIGN PATENT DOCUMENTS

| | | |
|---|---|---|
| 439926 | 8/1991 | (EP). |
| 0487231 | * 4/1992 | (EP). |
| 569178 | 11/1993 | (EP). |
| 687975 | 12/1995 | (EP). |

OTHER PUBLICATIONS

European Standard Search Report re RS 99559 Date of completion of search: Jan. 20, 1998.

Hagstrom, U. et al., "RBS 884: A New Generation Radio Base Stations for the American Standard", Ericsson Review, vol. 71, No. 1, pp. 4–13 (Jan. 1, 1994).

Primary Examiner—Vivian Chang
Assistant Examiner—Charles N. Appiah
(74) Attorney, Agent, or Firm—Burns, Doane, Swecker & Mathis, L.L.P.

(57) ABSTRACT

A method of loading software in cellular telecommunication systems is disclosed. The method permits software data to be loaded in the background while transceiver devices may be engaged in voice or data traffic. Each of the devices includes a run-time memory, backup memory, and a device processor. The data is transmitted from the mobile switching center to the backup memory of the designated device while the device is operating from run-time memory. In a first embodiment, the data is copied from backup memory to run-time memory when the device is idle. In a second embodiment, device operations are switched to run from backup memory when the device is idle. Subsequent software loading cycle between run-time and backup memories. In a third embodiment, a single memory bank comprises both run-time and backup memory. The backup memory area is located in a different location in the memory bank than the run-time memory area. The software data is written in the background to the backup memory area without disturbing device traffic. When the device is idle, the location pointer is switched to the backup memory area so that the device runs newly loaded software. The inventive concept permits efficient software loading that reduces downtime and is transparent to the user.

17 Claims, 2 Drawing Sheets

U.S. PATENT DOCUMENTS

| | | | |
|---|---|---|---|
| 5,548,640 | * 8/1996 | Blondel et al. | 379/242 |
| 5,555,418 | * 9/1996 | Nilsson et al. | 709/305 |
| 5,561,854 | * 10/1996 | Antic et al. | 455/433 |
| 5,594,942 | * 1/1997 | Antic et al. | 455/423 |
| 5,630,139 | * 5/1997 | Ozaki | 395/712 |
| 5,682,533 | * 10/1997 | Siljestroemer | 707/200 |
| 5,715,462 | * 2/1998 | Iwamoto et al. | 395/712 |
| 5,740,178 | * 4/1998 | Jacks et al. | 714/722 |
| 5,748,870 | * 5/1998 | Tims et al. | 395/182.02 |
| 5,751,574 | * 5/1998 | Loebig | 700/82 |
| 5,819,002 | * 10/1998 | Beeler, Jr. | 707/204 |
| 5,848,064 | * 12/1998 | Cowan | 370/338 |
| 5,887,254 | * 3/1999 | Halonen | 455/419 |
| 6,023,620 | * 2/2000 | Hansson | 455/419 |

BACKGROUND SOFTWARE LOADING IN CELLULAR TELECOMMUNICATION SYSTEMS

FIELD OF THE INVENTION

The present invention relates generally to software loading in cellular telecommunication systems, and it pertains in particular to a method of loading software in the background while maintaining voice or data traffic.

BACKGROUND OF THE INVENTION

Software loading plays a significant role in the operation of complex electronic equipment such as cellular telecommunication systems. Within cellular systems, software loading is necessary in several instances. For example, the functionality of modern cellular systems is, to a large extent, controlled by software. One common motivation for software loading is to provide system upgrades in the form of migratory releases of predetermined software packages. Furthermore, functional changes and enhancements may be added and activated by newly installed software. By way of example, an analog network operating on the Advanced Mobile Phone System (AMPS) can be upgraded to a Digital Advanced Mobile Phone System (D-AMPS) with relatively minor hardware modifications which are activated by new software.

FIG. 1 illustrates a current method for loading software in a typical cellular network. A computer terminal 10 used for loading software is coupled to a mobile switching center (MSC) 12. Terminal 10, generally located at the same site as MSC 12, permits loading from a centralized location. MSC 12 is linked to a plurality of base stations by way of a high speed digital connection, such as a pulse code modulation (PCM) link. The PCM link is an optical or wired link capable of efficiently delivering digital data over vast distances in accordance with a specified standard. One widely used standard link is a T1 link 14 which specifies transmission of data at 1.544 Mb/s. Furthermore, the T1 standard specifies the transmission of twenty four timeslots, where one timeslot corresponds to one analog conversation (AMPS) or three conversations in digital mode (D-AMPS). Of the twenty four timeslots, twenty three are used for carrying voice data and one, timeslot 9, is reserved for the transmission of control information. It is desirable to utilize the same transmission link for transporting both voice and software data to maximize efficiency, therefore, timeslot 9 is used to carry software data during loading.

T1 link 14 couples MSC 12 to base station one (BS1) for efficient high speed communication between the components. Base stations typically contain anywhere from eight to seventy two devices wherein each can include, for example, a transmitter and receiver (i.e. transceiver), Location Verification Module (LVM), Radio Frequency Test Loop (RFTL), Combiner Tuner Controller (CTC), or other microprocessor equipped units. The procedure for software loading requires that each of the devices be taken off-line or set in an idle state during loading. This is commonly referred to in the industry as "blocking" the device and must be done sequentially for each device prior to loading. Since it may take anywhere from seconds to several tens of seconds to load each device, it is readily apparent that the software loading may take a significant amount of time. It should be noted that the speed of loading depends greatly on the speed and capacity of the transmission line used. Furthermore, since a typical cellular network contains multiple base stations, each base station will have software loaded in its devices in a similar sequential fashion. In the forgoing example, MSC 12 is coupled to BS2 via T1 link 17 and BS3 is coupled to MSC 12 via T1 link 19. A complete software load for the entire network can take anywhere from several minutes to hours or even days. Thus a major limitation of this methodology is that each device is "forced" out of service for a specific period of time. While out of service, the devices cannot serve traffic thereby depriving cellular operators of potential revenue. Moreover, the current method is cumbersome, inefficient and time consuming thereby prompting the need for a better solution.

In view of the foregoing, it is an objective of the present invention to provide a technique for software loading in cellular telecommunication networks that is efficient and economical by permitting software loading while permitting devices to concurrently serve traffic.

SUMMARY OF THE INVENTION

Briefly described, and in accordance with multiple embodiments thereof, the invention provides a technique for transparently loading software in the background for cellular telecommunication networks. The method comprises the steps of transmitting software data over a digital transmission link to designated devices in a base station. Each device includes a run-time memory, a backup memory, and a device processor. Data is written to the backup memory in the background while the associated device may be in service. In a first embodiment of the present invention, the newly loaded data is copied from the backup memory to run-time memory when the device is idle.

In a second embodiment, after software data has been written to backup memory in the background, the processor switches device operations to run from backup memory when the device is idle. The switch enables the device to operate from the new software. A change in memory designation is also performed i.e. the backup memory becomes the current run-time memory and the previous run-time memory now becomes the current backup memory. A subsequent software load writes to the newly designated backup memory and an appropriate switch is again performed. Additional software loading will continue to cycle in this fashion.

In a third embodiment, a single memory bank comprising both run-time memory and backup memory is used in place of separate memory banks. The starting location for the backup memory is indicated by a pointer located sufficiently after the run-time memory. Similarly, the software is written to the backup memory in the background to avoid interfering with possible device traffic. When the device is idle, the processor switches code execution to the starting location for the backup memory. The device then operates from the new software and a switch in memory designation is performed. In a subsequent software load, the data is written to the former run-time memory area in the background. An appropriate pointer switch is again made by the device processor. Additional loads repeat the load-and-pointer switch cycle as needed.

The embodiments disclosed in the present invention provide a method of loading software that is efficient, economical, and transparent to the user. The method virtually eliminates down-time and revenue losses due to software loading for cellular operators. These and other advantages of the present invention will become apparent upon reading the following detailed descriptions and studying the various figures of the drawings.

BRIEF DESCRIPTION OF THE DRAWINGS

The invention, together with further objectives and advantages thereof, may best be understood by reference to the following description taken in conjunction with the accompanying drawings in which.

DETAILED DESCRIPTION OF THE PREFERRED EMBODIMENTS

In a basic cellular telecommunication system, a mobile switching center (MSC) is linked to a plurality of base stations by digital transmission links. The base stations are geographically dispersed to form an area of coverage for the system. Each base station (BS) is designated to cover a specified area or cell in which two way radio communication of voice or data can take place between a mobile station and the base station in the associated cell. The procedure for software loading is initiated at the MSC where the software data is distributed to the individual base stations. A description of a method for software loading in accordance to the present invention follows.

Figure 1:
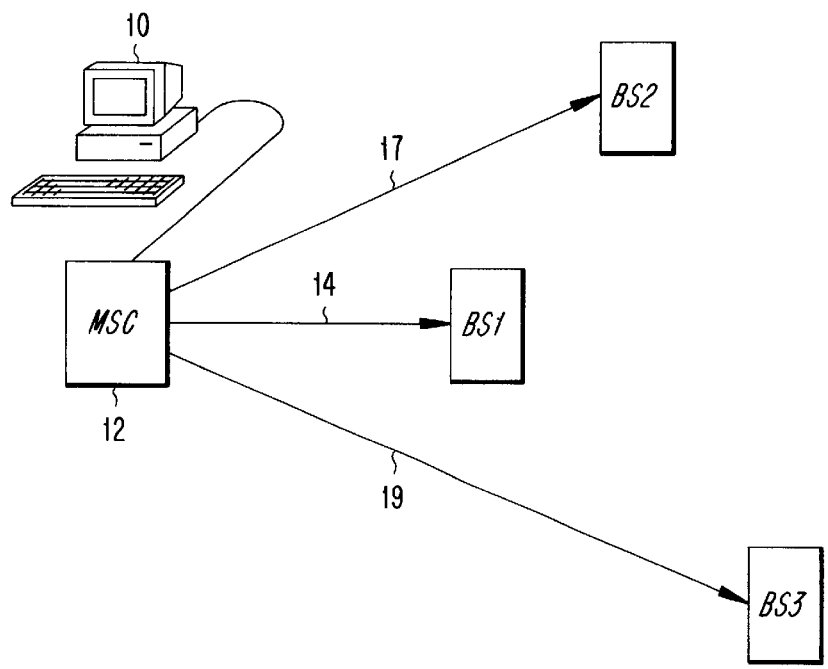
FIG. 1 shows a prior art method of loading software in a cellular telecommunication system.
Figure 2:
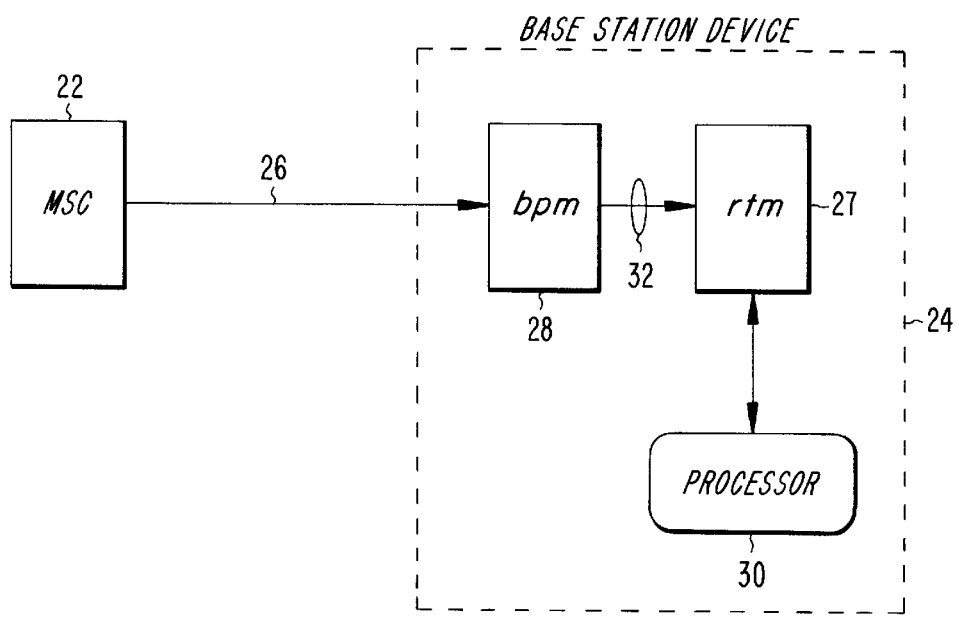
FIG. 2 illustrates a method of background software loading in accordance with a first embodiment of the present invention.

In an exemplary procedure, the software loading does not interfere with the operation of any active devices in the base station. This happens because the current resident software running the device does not get overwritten during the loading process. FIG. 2 illustrates a method of software loading in accordance with a first embodiment. For simplicity, an example of software loading for a single device in a base station (BS) is described. An MSC 22 is coupled to a BS 24 by way of a T1 link 26. In a software loading procedure, the device designated for software loading is selected by the MSC. The software data is then transmitted over the T1 link in timeslot 9 to BS 24 and routed to the designated device. Timeslot 9 of the T1 link specification is reserved for the transmission of control signals and is used for carrying software data during loading. It is known by those skilled in the art that the timeslot used for carrying software data during loading may vary in accordance to the standard used, for example, timeslot 16 is used for such data transfer in the E1 link specification. Furthermore, other protocols may be used that designate software data to be transmitted in multiple timeslots for faster, more efficient loading.

Components associated with each device in the base station include run-time memory (rtm) 27, backup memory (bpm) 28, and processor 30. The device runs from code stored in rtm 27 containing the current version of the operating software. The software loading process can be accomplished while the device is in operation, i.e. handling voice or data traffic. This occurs by writing the new software into to bpm 28 which is isolated from device operations. The action takes place in the background thereby permitting the device to be free from interruption during the load. Processor 30 sets up and monitors the data transfer to bpm 28 and, when the device becomes idle, directs the transfer of data from bpm 28 to rtm 27. The process of copying the data to rtm 27 takes place within an update time interval 32 in a matter of milliseconds. Copying from bpm 28 to rtm 27 can be initiated by signaling from MSC 22 in order to make sure that the act does not interfere with ongoing traffic. Time critical tasks relating to handling traffic can be given higher priority by the MSC than those relating to software loading.

Thus the MSC alerts the processor that the device is engaged and to delay copying the data to ensure traffic is maintained.

Modifications to existing equipment may be necessary to allow operation in accordance with the present embodiment. For example, the additional backup memory bank (bpm 28) may need to be added for each device and configured to receive transmitted software. Many existing devices contain processors that are used to block the device for software loading and maintenance etc. Modifications may be made to the part of resident software to allow the processor to manage the two memory banks. Furthermore, modifications to the operating software at the MSC can be made to implement the functionality for background software loading.

Figure 3:
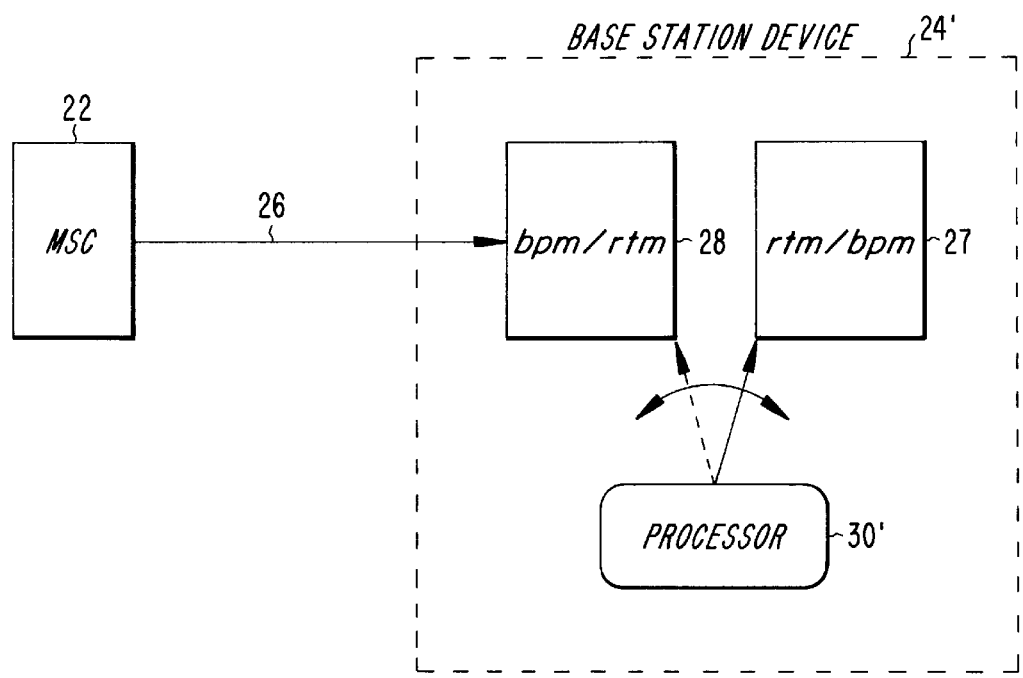
FIG. 3 illustrates a method of background software loading in accordance with a second embodiment of the present invention.

FIG. 3 illustrates a technique for background software loading in accordance with a second embodiment of the present invention. The embodiment is a slight variation of that in embodiment one and includes essentially the same device components of rtm 27, bpm 28, and device processor 30'. Similarly, MSC 22 transmits software data via T1 link 26 in timeslot 9 to bpm 28 of designated base station device 24'. Furthermore, software loading may proceed while the device is engaged in activity by writing the software data to bpm 28 in the background. Processor 30' manages the background activity and is alerted by MSC 22 when the device becomes idle. When an idle state is sensed, processor 30' has the possibility to immediately switch run-time operations from rtm 27 to bpm 28. That is, the bpm becomes the current rtm and vice versa such that ensuing device activities will operate from the new software. Alternatively, the MSC can direct the processors to delay until all devices have been updated before switching to the new software.

In the case of a subsequent software load, data is written to the former rtm and is subjected to an appropriate switch as described above. Additional software loads will cycle back and forth between the current designated rtm and bpm. The resident software for processor 30' includes a provision for keeping track of which memory bank contains the current rtm code. For existing devices, a relatively simple modification of the resident processor software is performed to include this functionality. A major advantage of the present embodiment is that, once the background software loading has been completed, the devices can switch to running the new software virtually instantaneously.

Figure 4:
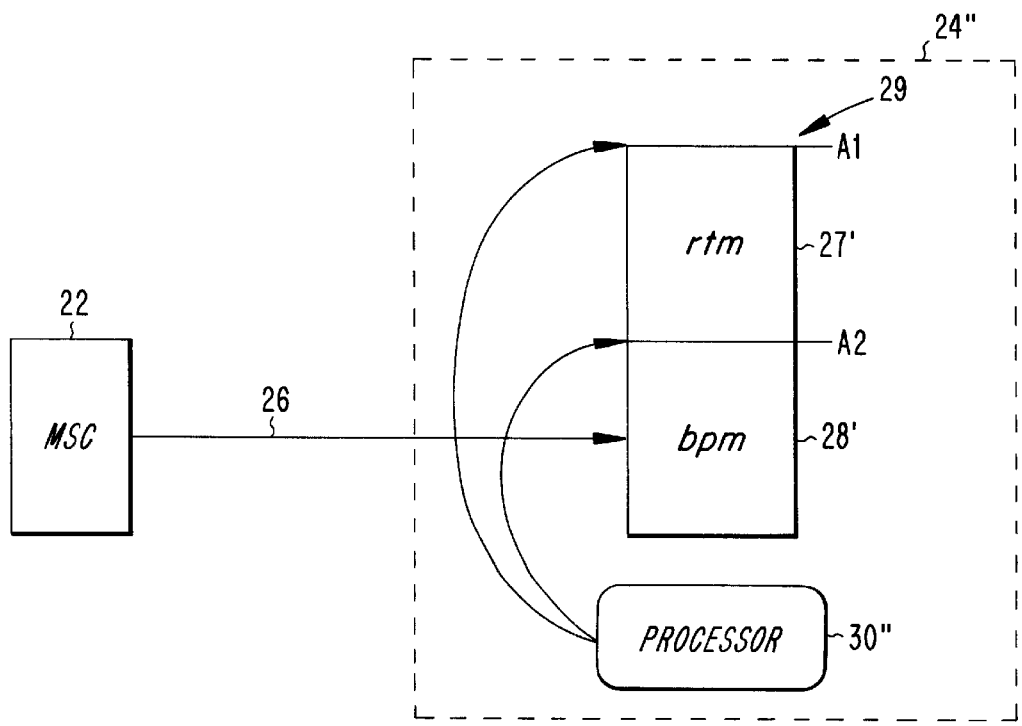
FIG. 4 illustrates a method of background software loading in accordance with a third embodiment of the present invention.

FIG. 4 illustrates a technique for background software loading in accordance with a third embodiment of the present invention. Similarly, MSC 22 transmits software data via T1 link 26 in timeslot 9 to bpm 28' of the base station device 24". The embodiment includes a single memory 29 with sufficient capacity to contain both rtm 27' and bpm 28' having respective starting addresses A1 and A2. Processor 30" directs the background loading to starting address A2 associated with bpm 28'. Meanwhile, the device operates from the software stored in rtm 27' and is undisturbed during software loading to bpm 28'. When the device becomes idle, processor 30" changes the pointer address from A1 to A2 to enable execution of the newly loaded software. In a subsequent loading, software is written to the space for the prior rtm 27', which then becomes the current bpm. No modifications to the memory configuration are needed thereby requiring only relatively minor alterations to the resident device software to enable the processor to keep track of the current memory designation and starting pointer address for the current rtm and bpm.

The present invention discloses a technique for conveniently loading software in the background that provides the capability to load, modify or replace software in cellular networks without interfering with active devices. The described method further provides an efficient and economical solution to software loading by eliminating costly down time. A further advantage is that no modifications to the standard method of software delivery are required since the standard T1 link continues to be used in the same way.

It will be appreciated by those skilled in the art that changes could be made to the embodiments described above without departing from the inventive concept thereof. In particular, the inventive concept may be applied to cellular systems operating in accordance with, for example, Code Division Multiple Access (CDMA), Global System for Mobile Communication (GSM), or Personal Digital Cellular (PDC). It should be understood that the invention is not limited to the particular embodiments disclosed, but it is intended to cover modifications within the spirit and scope of the invention as defined in the appended claims.

What is claimed is:

1. A method of loading software in a telecommunication system, wherein said telecommunication system comprises a mobile-switching center, a base station in communication with the mobile switching center by way of a digital transmission link, wherein said base station includes a run-time memory, a backup memory, and a device processor, the method comprising the steps of:

transmitting software data from the mobile switching center via the digital transmission link to the backup memory in the base station;

continuing to fully support telecommunication services software in said run-time memory while said software data is being loaded into said backup memory, wherein said support of telecommunication services software remains uninterrupted by said loading of said software data;

detecting that the base station is in an idle state; and executing the software data that has been loaded into the backup memory.

2. A method as recited in claim 1 wherein said executing step is performed by copying the software data from the backup memory to the run-time memory.

3. A method as recited in claim 2 wherein the copying of software data from the backup memory to the run-time memory is directed by the device processor.

4. A method as recited in claim 2 wherein the copying of software data occurs during an update time interval.

5. A method as recited in claim 1 wherein the transmission of data via the digital transmission link occurs in timeslot 9 allocated in the T1 link standard.

6. A method as recited in claim 5 wherein the transmission of data occurs in multiple timeslots.

7. A method as recited in claim 1 wherein said executing step is performed by switching operations from the run-time memory to the backup memory by the device processor thereby causing operations associated with at least one transceiver device to run from the newly loaded software.

8. A method as recited in claim 1 wherein the run-time memory and the backup memory are comprised in a single memory bank, and wherein said executing step is performed by changing a location pointer to the backup memory thereby causing operations associated with at least one transceiver device to run from the newly loaded software.

9. The method of claim 1, wherein said step of detecting further comprises the step of:

signalling, from said mobile switching center to said device processor, that an idle state exists for said device processor.

10. A telecommunication system comprising:

a mobile switching center;

a base station in communication with the mobile switching center via a digital transmission link, said base station including a plurality of transceiver devices wherein each of said devices includes a run-time memory bank, a backup memory bank, and a device processor; and a mobile station in wireless communication with the base station;

wherein software data is transmitted from the mobile switching center to one of said transceiver devices via the transmission link to the backup memory bank, and wherein ongoing traffic of said one transceiver device is uninterrupted and fully handled by the runtime memory bank while said software data is being loaded into said backup memory bank and further wherein said software data is executed to handle subsequent traffic when said base station is in an idle state.

11. A telecommunication system as recited in claim 10 wherein said digital transmission link is a T1 optical link.

12. A telecommunication system as recited in claim 10 wherein the device processor copies the data from the backup memory to the run-time memory when said one transceiver device is idle.

13. A telecommunication system as recited in claim 10 wherein the device processor, wherein when signaled by the mobile switching center, switches device operations from the run-time memory to the backup memory thereby executing the newly loaded software.

14. A telecommunication system as recited in claim 10 wherein the run-time memory and the backup memory comprise a single memory bank such that the backup memory is assigned a different starting address than the run-time memory, and wherein the processor switches device operations from run-time memory to run from the backup memory in order to execute the newly loaded software by changing a pointer to said different starting address.

15. The telecommunication system of claim 10, wherein said mobile switching center sends a signal to said device processor that said idle state exists therefor.

16. A telecommunication system comprising:

a base station including a plurality of transceiver devices, whereon each of said devices includes a run-time memory bank that fully supports a first services software, a backup memory bank, and a device processor;

a mobile station in wireless communication with said base station; and a mobile switching center in communication with said base station via a digital transmission link;

wherein a second services software is transmitted from said mobile switching center to one of said transceiver devices via the digital transmission link to the backup memory bank while ongoing traffic of said one transceiver device is uninterrupted and fully supported by the run-time memory bank; and wherein upon finishing loading said second services software into the backup memory bank and detecting of said base station in an idle state, the device processor executes the second services software stored in the backup memory to fully support ongoing traffic of said one transceiver device.

17. The telecommunication system of claim 16, wherein said mobile switching center sends a signal to said device processor that said idle state exists therefor.

* * * * *